United States Patent Office 3,086,397
Patented Apr. 23, 1963

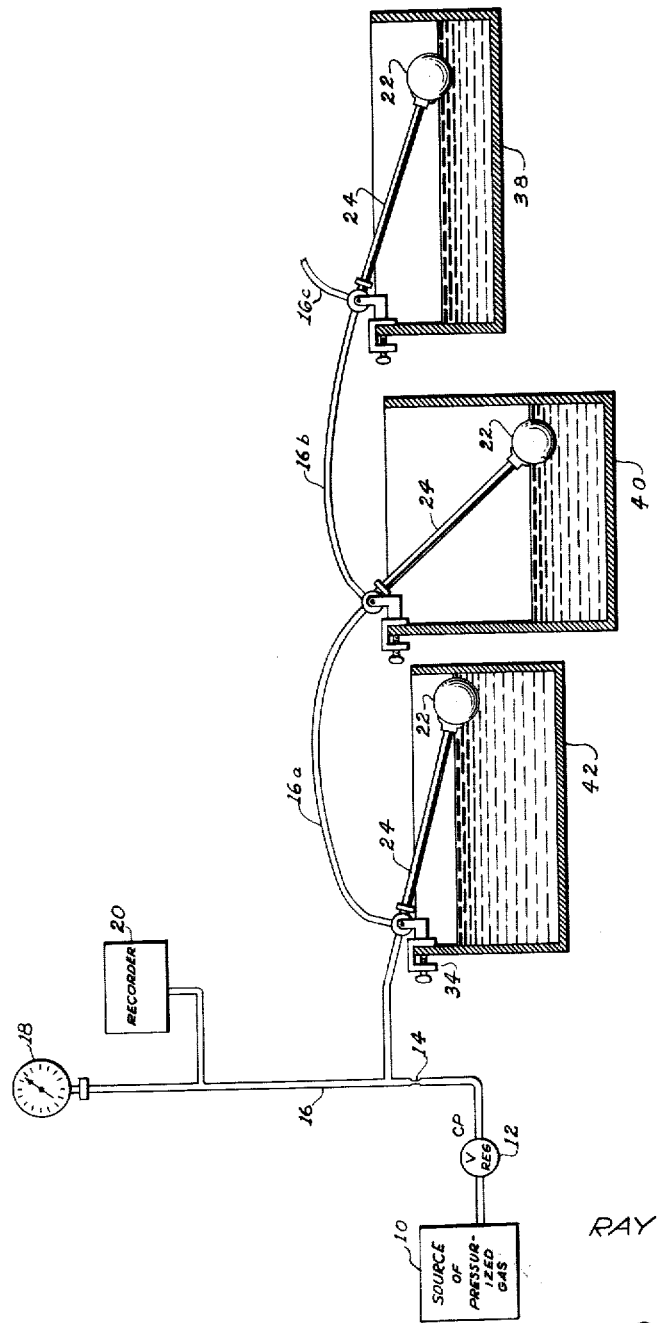

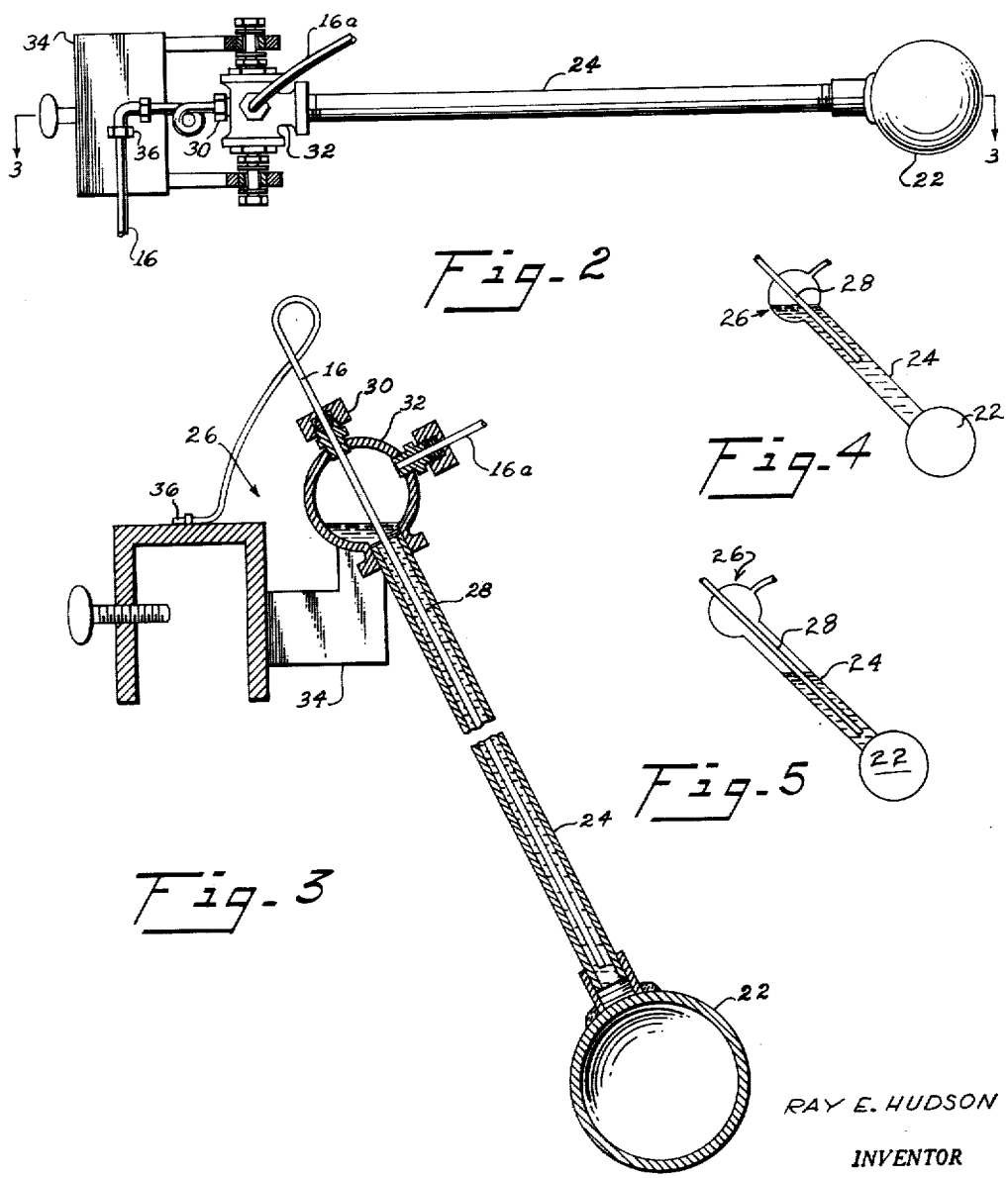

1

3,086,397
PNEUMATIC DEVICE
Ray E. Hudson, Odessa, Tex., assignor to Bell Corporation, Odessa, Tex., a corporation of Texas
Filed Apr. 8, 1960, Ser. No. 20,928
10 Claims. (Cl. 73—311)

This invention pertains to determining the level of one or more members with a particular application of determining the volume of liquid present in a plurality of tanks of different cross-setcional area.

In many operations it is desirable to have liquid in several tanks not of the same cross-sectional area. It is also desirable to determine the total volume of liquid in all of these tanks.

An object of this invention is to provide means to measure, and record, the total volume in a plurality of tanks, each tank of different cross-sectional area.

Also an object of this invention is to provide a new instrument for determining the level of any single member. This member could be a float upon the surface of liquid within a tank or it could be a member such as the traveling block of an oil well drilling rig.

Another object of this invention is to provide a new device for determining the liquid level of a single tank.

A further object is to determine the total volume of liquid contained in a plurality of tanks of the same cross-sectional area.

A still further object is to determine the volume of a single tank wherein there are multiple cross-sectional area, e.g. a cylindrical tank with a horizontal axis.

Still further objects are to achieve the above with a device that is sturdy, compact, durable, simple, and reliable, yet inexpensive and easy to manufacture.

The specific nature of the invention as well as other objects, uses, and advantages thereof will clearly appear from the following description and from the accompanying drawing, in which:

FIG. 1 is a schematic representation of a system for measuring the total volume in a plurality of tanks according to this invention.

FIG. 2 is a plan view of a single integral float and tube unit according to this invention.

FIG. 3 is a sectional view of the float and tube unit taken on line 3—3 of FIG. 2.

FIG. 4 is a schematic representation of one means to adjust the unit shown in FIG. 3.

FIG. 5 is a schematic representation of another means to adjust the unit shown in FIG. 3.

As may be seen in the accompanying drawings the entire system is represented as a pneumatic one depending upon source 10 of gas under pressure, ordinarily compressed air.

The compressed air passes through a regulator 12 where its pressure is reduced to a constant value. The amount of pressure or consistency is not particularly critical. After the pressure has been reduced to some more or less standard value, the gas passes through orifice 14 in the line from the regulator. The pressure, as measured in line 16 after the gas passes through the orifice 14, will be inversely proportional to the total volume of liquid in all of the tanks. This pressure is read by gauge 18 and may also be recorded by recorder 20. Since

2 pressure gauges and recorders are well known to the art they are not further described except the common type is used which actually measures a difference in pressure, the difference being between the pressure in line 16 and atmospheric pressure.

It is desired to ascertain the level of member 22 (FIGS. 2 and 3). As may be seen, member 22 is a float adapted to float on the surface of a liquid thus determining the liquid level. Otherwise stated, the float 22 is a means for determining the liquid level of a tank. However, member 22 could be any object for which it was desired to determine the level. Member 22 is connected to liquid tube 24 and the tube filled or approximately filled with a liquid to a point of attachment to some fixed point 26, such as a tank wall. The bottom of tube 24 is closed. There will be a difference in pressure from the top of tube 24 to the bottom of tube 24 depending upon two factors: the vertical distance from the surface of the liquid in tube 24 to the bottom of the tube 24 and the density of this liquid. If the tube is filled with liquid, the distance will be the vertical distance from the fixed point to a reference point on member 22. It will be noted that this difference in pressure is not in any way dependent upon tube 24 being rigid (provided that a homogeneous liquid fills the entire tube to the fixed point) or the particular path between the surface of the liquid and the end of the tube. The difference in pressures is inversely proportional to the level of the fluid in the tank. If the tank is uniform in cross-sectional area the difference in pressure will be proportional to the volume in the tank. Thus a means is provided to measure the level of the member 22, which is the liquid level of the tank.

Inner tube 28 extends within each tube 24. The junction between the inner tube and the liquid tube 24 is hermetically sealed. The inner tube 28 is connected to line 16 and the terminal end of inner tube 28 is open below the surface of the liquid in tube 24. The space above liquid surface in tube 24 is connected to line 16a. The connection between the line 16a and the space above the surface of the liquid is tube 24 is hermetically sealed.

The difference in pressure, which is a measure of the level, is converted into a change in gas pressure. The orifice 14 in the line from the pressure regulator allows a small flow of gas. The gas forces itself through the inner tube to the bottom of the liquid tube. The pressure in line 16 will be the sum of the pressure which exists at the top of the liquid (or line 16a) and the pressure due to the head of the liquid in tube 24, otherwise the gas will not bubble through. Thus is provided a means for producing a differential gas pressure from a source of pressurized gas proportional to the liquid level of a tank as determined by the measuring means previously described.

Assuming the mechanism is for a single tank: The line 16a is vented to the atmosphere. The gauge 18 will read inversely proportional to the volume of liquid within the tank.

Assuming that the mechanism is calibrated for the largest tank wherein it is to be used, and it is desired to use it in a tank of smaller cross-sectional area: There are three basic ways this change or adjustment may be made. First, the density of the liquid within tube 24 can be made proportional to cross-sectional area of the tank. If the cross sectional area of the tank were half as much as for the largest tank, then the total density of the fluid within tube 24 would be half as great. It is not necessary that tube 24 contain a single liquid, e.g. it could contain a mixture of mercury and oil, provided the tube were rigid. Second, the amount of liquid within tube 24 can be made proportional to the cross-sectional area (FIG. 5). If the tube 24 is only half full, the height from the member 22 the fixed point 26 will be twice the distance from the surface of the liquid to the member 22 for any position of the float. Third, the tube 28 can be immersed within the liquid proportional to the cross-sectional area of the tank. This is illustrated in FIG. 4. For any position of the float the pressure difference produced by the inner tube only half immersed will be half as great as if fully immersed.

The third method offers a simple manner in which the float may be used for any tank. If the full length of the immersion will give a certain reading as calibrated on the gauge 18 for a tank of 1,000 sq. ft. of surface area and it is desired to use the float to measure the volume of a tank having 560 sq. ft. of surface area, the tube 28 is adjusted so that it is only .56 as fully immersed. This is provided by making an adjustable joint 30 at the point the tube 28 enters the tube 24.

An ordinary pipe T 32 is pivoted to bracket 34. The bracket 34 is a means for attaching the device to a tank wall. A simple pivot joint is provided whereby the two opposite ends of the T are sealed and so that the tube 24 can swing up and down. Tube 24 is attached to the other connection of the T. Two holes are drilled and tapped within the T, one opposite and axially aligned with the tube 24. Brass fitting 30 is attached into this tapped hole, thus providing means for inserting the inner tube 28 into the tube 24. We have had good success using ordinary plastic tubing for the inner tube. The excess tubing not inserted is not cut off but is looped as may be seen in FIG. 2 and attached to the bracket by a connection 36. Therefore by loosening the joint 30, more or less of the tube may be run into or out of the tube 24 providing a simple field adjustment. Thus the means for measuring the level of member 22 and converting this to a difference in gas pressure is combined in an integral unit.

Reference is now made to FIG. 1 where measurement is made of the total volume of a plurality of tanks. A standard unit is placed upon each tank and the tube 28 adjusted within the tube 24 so that each tank will provide differential pressure between the surface of the fluid in 24 and the terminal of the inner tube 28 which is inversely proportional to the volume of liquid within that tank, regardless of the cross-sectional area of the tank. These devices are connected in series with the space above tube 24 of one device being the source of air pressure for the inner tube 28 of the succeeding tank. Line 16*b* connects tube 28 of last tank 38 to tube 24 of middle tank 40. The pressure in line 16*b* will be greater than atmospheric pressure by a value inversely proportional to the volume of liquid within last tank 38, as tube 24 of last tank 38 is vented to the atmosphere by short vent tube 16*c* connected to the T 32. Likewise the pressure in line 16*a* (connecting tube 28 of mid tank 40 to tube 24 of first tank 42) will be greater than the pressure in 16*b* by an amount inversely proportional to the volume of liquid in tank 40. The sum of the pressures due to the tubes in tanks 38, 40 and 42 will be the pressure in line 16. Therefore the indicator 18 is means for indicating the total of the pressure differences on each of the three devices because it measures the difference between the pressure in line 16 and the atmosphere.

From the above it may be seen that the pressure before the orifice is not critical so long as it is greater than the sum of the pressure differences of the various tanks, therefore there is no need for an extremely sensitive pressure regulator 12. Likewise, it may be seen that there is theoretically no limit of the number of tanks upon which this may operate, three being illustrated as a matter of convenience.

In any installation it is desirable to limit the travel of the tube so that the float is always below the level of the fixed point. Otherwise stated that the fixed point can be fixed at a point above the highest level reached by member 22. If no other means are provided, a stop is provided to prevent the member 22 to rising to a higher level.

It will be apparent further that the embodiments shown are only exemplary and that other and various modifications can be made in construction, material and arrangement within the scope of the inventions defined in the appended claims.

I claim as my invention:

1. A liquid volume indicator for a plurality of tanks comprising: a plurality of measuring means, each being a measuring means for determining the liquid level of one of said plurality of tanks, a plurality of converting means each being a converting means for producing a differential gas pressure from a source of pressurized gas proportional to the liquid level of each tank as determined by the measuring means, and an indicator of gas pressure differences; all the converting means connected in series with each other and with the indicator so that the indicator indicates the sum of the pressure differences obtained by all the converting means.

2. The invention as defined in claim 1 wherein the individual measuring means and converting means are combined in an integral unit.

3. The invention as defined in claim 1 wherein the proportion by which the liquid level of each tank is converted to a differential gas pressure is related to the cross sectional area of that tank.

4. A level indicator comprising: a member the level of which is to be determined, a tube attached at one end of the member, the other end of the tube attached to a fixed point above the highest level reached by the member, a liquid in the tube filling the tube, a source of pressurized gas, a second tube connected to the source of pressurized gas and opening at the bottom of the first tube.

5. The invention as defined in claim 4 wherein the first tube is rigid and pivoted to said fixed point, the member is a float for floating on the surface of a liquid, and the liquid in the tube has a surface intermediate the float and fixed point.

6. A level indicator comprising: a float for floating on the surface of a liquid, a rigid tube attached at one end to the float, the other end of the rigid tube pivoted to a fixed point above the highest level reached by the float, a second liquid in the rigid tube, an inner tube within the rigid tube, said inner tube connected at about the fixed point to a source of pressurized gas, and the other terminal of the inner tube opening below the level of the liquid in the rigid tube.

7. The invention as defined in claim 6 wherein there are a plurality of units so described in series and each rigid tube is hermetically sealed, the space above the liquid surface of at least one rigid tube is the source of pressurized gas for the inner tube of another unit, and the space above the liquid surface of the last in the series of rigid tubes is vented to atmosphere.

8. The invention as defined in claim 7 wherein the distance from the surface of the liquid in the rigid tube to the other terminal of the inner tube is related to the cross sectional area of the container of the liquid upon which the float floats.

9. A liquid volume indicator for a plurality of tanks comprising: a float for floating on the surface of liquid of each tank, a liquid tube for each float connected at one end to the float and at the other end to a fixed point on the tank, each tube having liquid therein, converting means integral with the float and tube of each tank for producing a differential gas pressure from a source of pressurized gas proportional to the head of liquid in the tube, and means for indicating pressure difference connected in series with the converting means which are themselves connected in series.

10. The invention as defined in claim 9 wherein the converting means includes an inner tube within said liquid tube, one end of the inner tube adapted to be connected to a source of pressurized gas and the other end below the surface of the liquid within the liquid tube.

References Cited in the file of this patent

UNITED STATES PATENTS

| 1,792,754 | Myers | Feb. 17, 1931 |
| 2,559,436 | Isserstedt | July 3, 1951 |

FOREIGN PATENTS

| 249,825 | Great Britain | June 17, 1926 |
| 482,802 | Great Britain | Apr. 5, 1938 |

UNITED STATES PATENT OFFICE
Certificate

Patent No. 3,086,397　　　　　　　　　　　　　　　Patented April 23, 1963

Ray E. Hudson

Application having been made by Ray E. Hudson, the inventor named in the patent above identified; and Bell Corporation, Odessa, Texas, a corporation of Texas, the assignee, and Walter T. Knauth of Houston, Texas for the issuance of a certificate under the provisions of Title 35, Section 256, of the United States Code, adding the name of the said Walter T. Knauth as a joint inventor, and a showing and proof of facts satisfying the requirements of the said section having been submitted, it is this 13th day of May 1969, certified that the name of the said Walter T. Knauth is hereby added to the said patent as a joint inventor with the said Ray E. Hudson.

[SEAL]

EDWIN L. REYNOLDS,
*First Assistant Commissioner of Patents.*